US009536212B2

(12) United States Patent
Portier et al.

(10) Patent No.: US 9,536,212 B2
(45) Date of Patent: Jan. 3, 2017

(54) WEB BROWSER-BASED BUSINESS PROCESS MANAGEMENT ENGINE

(75) Inventors: Bertrand H. Portier, Austin, TX (US); Suraj Shinde, Mexico City (MX)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 13/160,691

(22) Filed: Jun. 15, 2011

(65) Prior Publication Data
US 2012/0110157 A1 May 3, 2012

(51) Int. Cl.
*G06F 15/173* (2006.01)
*G06Q 10/06* (2012.01)
*G06F 17/30* (2006.01)
*H04L 29/08* (2006.01)

(52) U.S. Cl.
CPC ......... *G06Q 10/06* (2013.01); *G06F 17/30893* (2013.01); *H04L 67/00* (2013.01); *H04L 67/02* (2013.01); *H04L 67/34* (2013.01)

(58) Field of Classification Search
None
See application file for complete search history.

(56) References Cited

U.S. PATENT DOCUMENTS

| 6,789,252 B1* | 9/2004 | Burke et al. ................. 717/100 |
| 2003/0101235 A1 | 5/2003 | Zhang |
| 2005/0198394 A1 | 9/2005 | Waldorf et al. |
| 2006/0287967 A1* | 12/2006 | Dan et al. ....................... 705/80 |
| 2010/0095269 A1* | 4/2010 | Bouillet et al. .............. 717/104 |
| 2010/0125797 A1 | 5/2010 | Lavi et al. |

OTHER PUBLICATIONS

Roychowdhury et al., Take advantage of Web 2.0 for next-generation BPM 2.0, http://www.ibm.com/developerworks/webservices/library/ws-web2bpm2, Sep. 12, 2008, 9 pages.
Mark McLaren, Mark McLaren's Weblog, http://cse-mjmcl.cse.bris.ac.uk/blog/2005/12/16/1134724887443.html, Dec. 16, 2005, 2 pages.
TEC Vendor showcase, Intellect 6.3.5 by Interneer, http://www.vendor-showcase.com/software/285-24055/Business-Process-Management-BP . . . , Copyright 2010 Technology Evaluation Centers Inc., 2 pages.
Data Capture Solutions, Workflow and Business Process Management, http://www.dcs.co.uk/business-solutions/business-process-management.html, Copyright 2009-2010 DCS, 2 pages.
Ajaxian, Pow: Excuse me sir, you seem to have a server in your client, http://ajaxian.com/archives/pow-excuse-me-sir-you-seem-to-have-a-serve . . . , Feb. 9, 2007, 1 page.

* cited by examiner

*Primary Examiner* — Jeffrey R Swearingen
(74) *Attorney, Agent, or Firm* — Daniel Simek; Hoffman Warnick LLC (57) ABSTRACT

A computer-implemented process for a Web browser-based business process management engine. In an embodiment, the process embeds a lightweight business process management engine in a Web browser to form a Web browser-based business process management engine, and choreographs service invocations using the Web browser-based business process management engine.

17 Claims, 8 Drawing Sheets

WEB BROWSER-BASED BUSINESS PROCESS MANAGEMENT ENGINE

TECHNICAL FIELD

This disclosure relates generally to browser technology in a data processing system and more specifically to a business process management engine implementation in a Web browser in the data processing system.

RELATED ART

Business process management (BPM) enables companies to model and improve critical business processes as well as automate steps in the processes. The modified processes are deployed in an environment, a process server/workflow engine/BPM engine, to execute the processes. The processes are monitored and managed.

Web Oriented Architecture (WOA), also referred to, as Enterprise Web 2.0 is an architecture for distributed systems including the World-Wide Web. Seen as an evolution, or a subset, of Service Oriented Architecture (SOA), services in a WOA environment are provided and invoked using Representational State Transfer (REST) and similar programming models. REST is a particular style of software architecture for distributed hypermedia systems consisting of clients and servers. Clients initiate requests to servers while servers process requests and return responses to the requesting clients. The requests and responses are created and managed in a context of transfers of representations of resources.

BPM (and SOA) activities are classified in a lifecycle with a series of phases referred to as Model-Assemble-Deploy-Manage. Model is a phase of modeling and simulating business processes. Assemble is a phase of building code for individual services and the process being modeled. Deploy is a phase in which transfer of process flows to and execution on a BPM runtime occurs. Manage is a phase in which occurs managing and monitoring of business process executions.

A problem with existing BPM frameworks is complexity and the use on N-tier architectures. For example, a process flow runs in a heavyweight process server such as commercial/open source BPM Servers, implemented on Java® EE architecture (Java is a registered trademark of Oracle Corporation and/or its affiliates).

The current framework requirements impose a high barrier for businesses wanting to enter the BPM space. Existing workflow solutions are server-based, highly centralized and based on heavyweight systems. Moreover, these workflows only communicate with other server-based workflows exposing and consuming server-hosted services.

Figure 4:
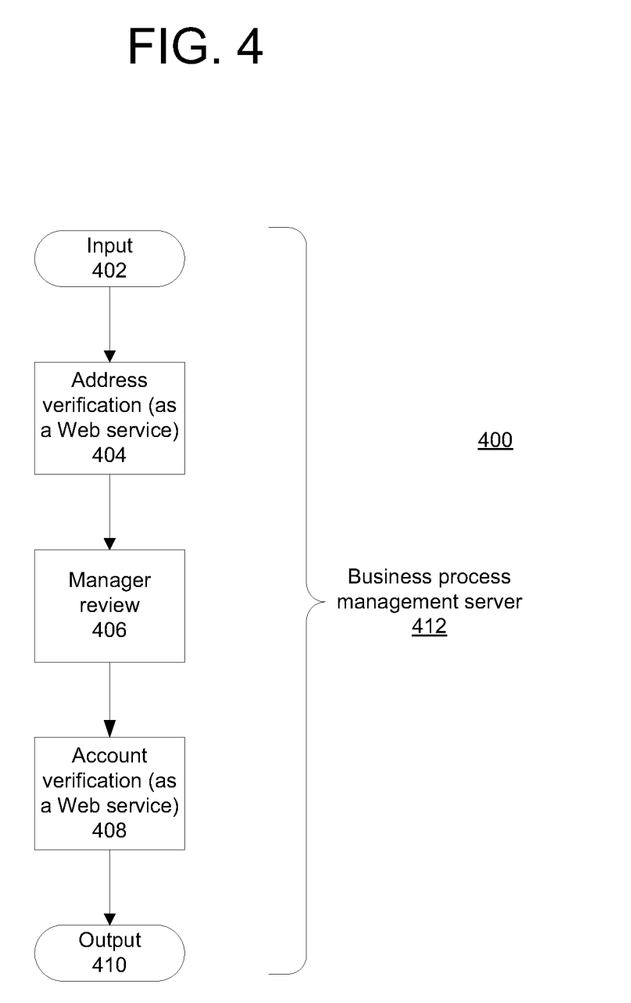
FIG. 4 is a sequence diagram of an example approval process in a context of a business process management server.

With reference to FIG. 4, a sequence diagram of an example approval process is presented. FIG. 4 depicts an example of using a traditional process flow implementation, in which the business process is an approval process.

Process 400 executes on business process management server 412, and comprises activities including address verification 404, manager review 406 and account verification 408 with input 402 and output 410. Address verification 404, and account verification 408 are traditional Web services.

Address verification 404 is an implementation of a Web service, for example, as in a .NET implementation operating on a business process management server or web server (Microsoft®.NET is available from Microsoft Corporation, Microsoft is a registered trademark of Microsoft Corporation in the United States and/or other countries). Manager review 406 is a human task where a manager uses a Web browser to perform the task. Account verification 408 is another Web service, for example in a Java EE implementation operating on a business process management server or Web server. Process 400 runs in business process management server 412. Address verification 404 and account verification 408 may operate on the same business process management server 412 or different business process management servers or web servers.

Solutions exist today to simplify the problem of hosting individual services. For example, Opera™ Unite is a Web browser that can be used as a Web server as well (Opera is a trademarks of Opera Software ASA. However, Opera Unite manages and runs individual services only. Opera Unite does not support choreography, including composition and workflow of these services, required by BPM. Moreover with Opera Unite the Web browsers do not communicate directly among each other; rather communication is performed through a web proxy server of Opera Unite. Using the Web proxy server, a user provides the Opera Unite URL of the user computer to enable other computers to access the computer of the user. The URL comprises a name of the user computer, the Opera user name, the name of the Unite service used (for example, file sharing) and user password. Thus, there is no dynamic discovery of Web browsers and individual services running on the Web browsers.

In another example, Paper Airplane and The Two Way Web (https://paperairplane.dev.java.net/) is also a Web browser that can be used as a Web server. A difference from the previous example is an implementation using peer-to-peer JXTA (P2P/JXTA™) technology. JXTA is a Java® and extensible markup language based framework comprising a set of standards supporting peer-to-peer applications (Java is a registered trademark and JXTA is a trademark of Oracle and/or its affiliates). P2P/JXTA is fully decentralized using a concept referred to as P2P Mesh. Mesh networks comprise distributed networks, which use a routing technology to enable dynamic determination of which route a data packet takes. Creating a peer-to-peer network of all other executing Paper Airplane browsers to enable dynamic discovery uses a specialized domain name system called DisDNS for storing self defined domain name server (DNS) names and resolving the names from within the Web browser. However Paper Airplane does not run any individual services or support choreography including composition and workflow of services, required by BPM. REST provides an architectural style and programming model optimized for the World-Wide Web, and is lighter-weight than traditional N-tier architectures. Similarly, REST does not support service choreography, only individual service invocation.

Web browsers can be used as Web services servers, in which the Web services hosted by the browser can be invoked as part of a business process. The business process (process flow), however, runs on a server-based business process management engine and not in the Web browser.

Business Process Modeling Notation (BPMN) provides a language for modeling business processes. Some vendors provide Web-based modeling tools but vendors then require the modeled business processes to be deployed on a server-side engine (BPMN or BPEL).

Business Process Execution Language (BPEL) defines how to choreograph service invocations. BPEL implementations are server-based. Vendors do not provide a Web browser-based BPEL engine. For example, a vendor product claims to be a browser-based BPM solution but the implementation is on Java EE and is therefore server-based.

Business processes (process flows) can be managed and operated from client-side Web browsers but the role of the browser is limited to a client-side graphic user interface (GUI) within the BPM architecture. Full potential of the Web browser is not being utilized. Current solutions typically provide a capability to model and design BPM solutions in a browser, but then require deployment of the solution to a server based BPM/Workflow engine. In addition, services that are choreographed by the BPM engine also run on servers using N-tier architecture.

SUMMARY

According to an embodiment, a computer-implemented process for a Web browser-based business process management engine receives a Web browser, embeds a lightweight business process management engine in the received Web browser to form a Web browser-based business process management engine, and choreograph service invocations using the Web browser-based business process management engine.

According to another embodiment, a computer program product for a Web browser-based business process management engine comprises a computer recordable-type media containing computer executable program code stored thereon. The computer executable program code comprises computer executable program code for receiving a Web browser, computer executable program code for embedding a lightweight business process management engine in the received Web browser to form a Web browser-based business process management engine, and computer executable program code for executing services using the Web browser-based business process management engine.

According to another embodiment, an apparatus for a Web browser-based business process management engine, comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit executes the computer executable program code to direct the apparatus to receive a Web browser, embed a lightweight business process manager in the received Web browser to form a Web browser-based business process management engine, and choreograph service invocations using the Web browser-based business process management engine.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION OF THE INVENTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer system, special purpose computer system, or other programmable data processing apparatus to produce a machine, such that the instructions, which execute via the processor of the computer or other programmable data processing apparatus, performs actions for implementing the functions/acts specified in the flowchart and/or block diagram block or blocks.

These computer program instructions may also be stored in a computer readable medium that can direct a computer system or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer system or other programmable data processing apparatus to cause a series of operational steps to be performed on the computer system or other programmable apparatus to produce a computer-implemented process such that the instructions which execute on the computer or other programmable apparatus provide processes for implementing the functions/acts specified in the flowchart and/or block diagram block or blocks.

Figure 1:
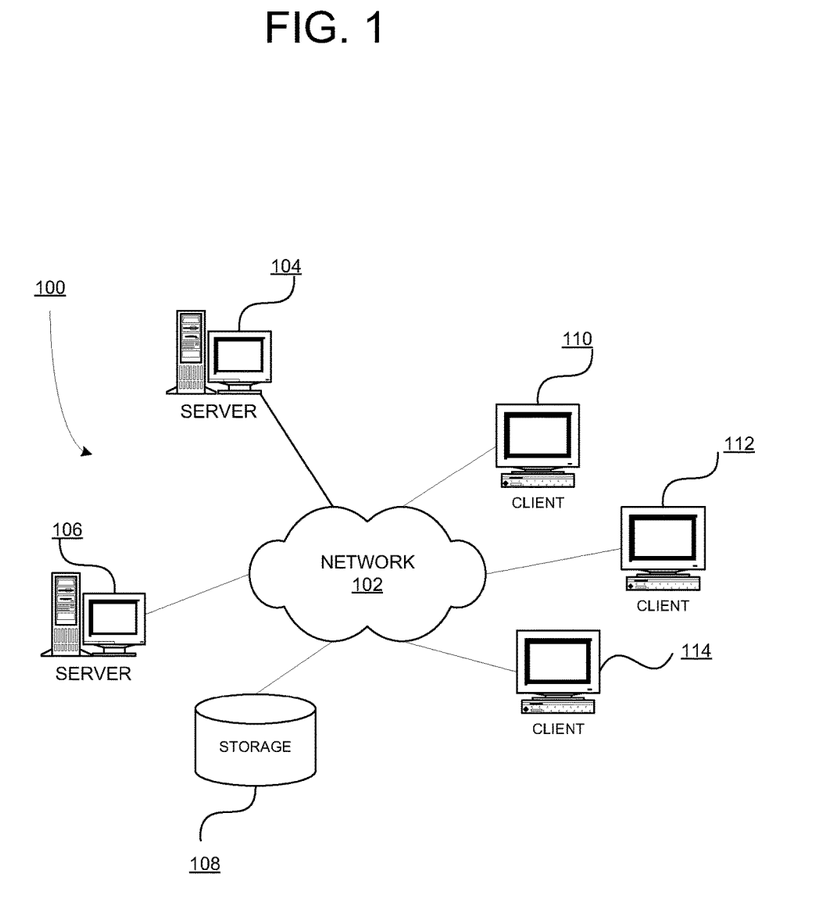
FIG. 1 is a block diagram of an exemplary data processing system network operable for various embodiments of the disclosure.
Figure 2:
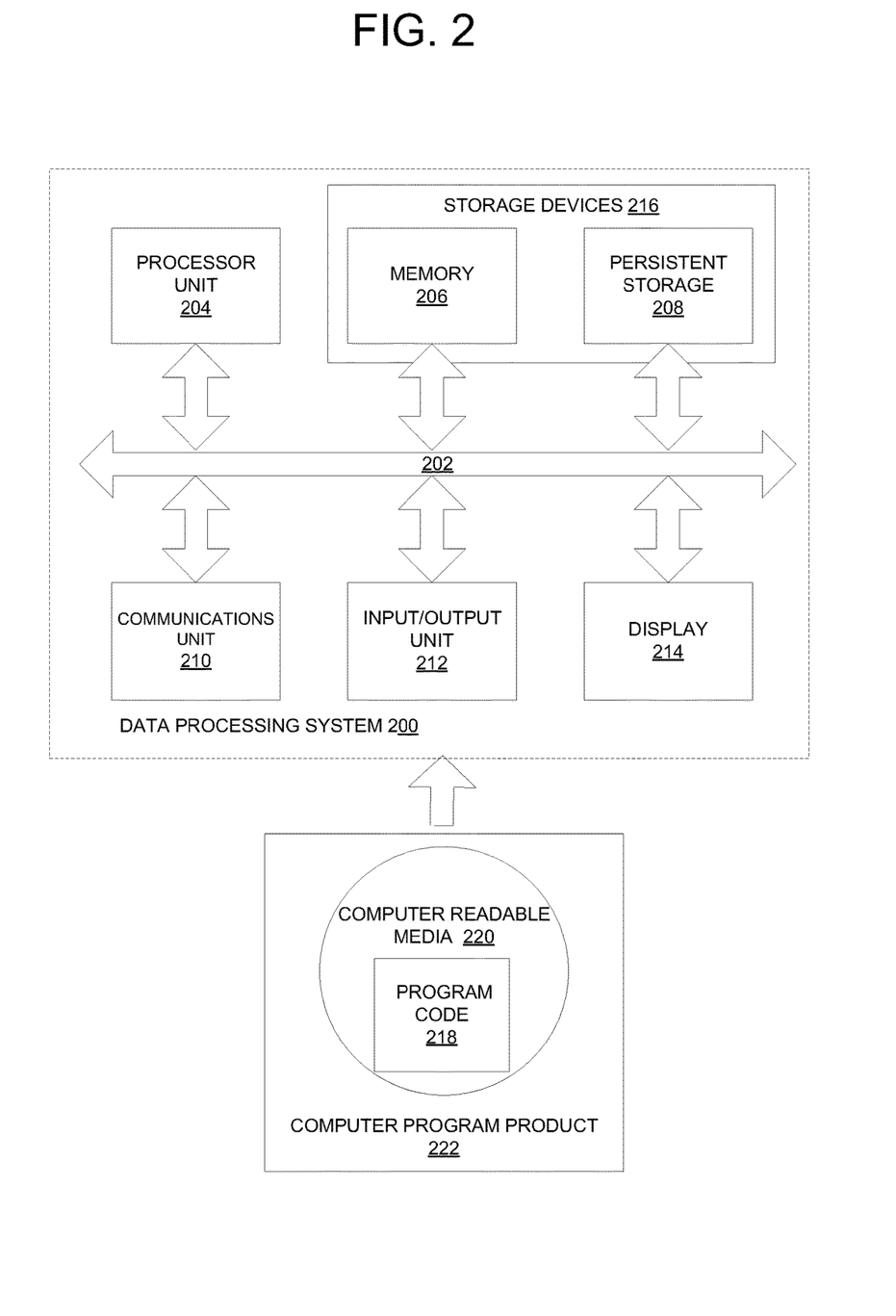
FIG. 2 is a block diagram of an exemplary data processing system operable for various embodiments of the disclosure.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary computer system or data processing system 200 operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for a Web browser-based business process management engine is presented. Processor unit 204 receives a Web browser, through devices including communications unit 210 or from input/output unit 212 or storage devices 216, and embeds a lightweight business process management engine in the received Web browser to form a Web browser-based business process management engine. Processor unit 204 choreographs service invocations using the Web browser-based business process management engine.

The services being executed are steps in a workflow that are typically local browser-based web services using REST protocol and web services/workflows using REST protocol implemented on other web browser-based business process management engine systems. The implementation of a lightweight business process management engine to form a Web browser-based business process management engine provides a capability for management of a browser-to-browser workflow system, enabling Web browsers to serve as business process management engines and choreograph service invocations. Using an embodiment of a Web browser-based business process management engine, the full business process management lifecycle is supported in the browser, including phases of Model, Assemble, Deploy, and Manage.

In another example, a computer-implemented process, using program code 218 stored in memory 206 or as a computer program product 222, for a Web browser-based business process management engine, comprises a computer recordable storage media, such as computer readable media 220, containing computer executable program code stored thereon. The computer executable program code comprises computer executable program code for a Web browser-based business process management engine.

In another illustrative embodiment, the process for a Web browser-based business process management engine may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process for a Web browser-based business process management engine.

Figure 3:
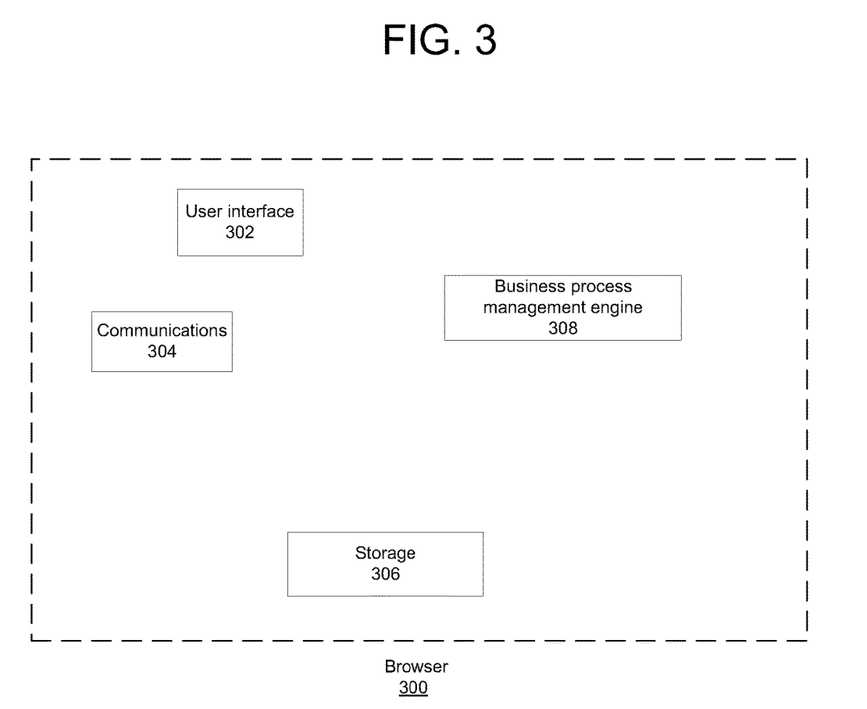
FIG. 3 is a block diagram of components of a Web browser-based business process management engine system, in accordance with an embodiment of the disclosure.

With reference to FIG. 3, a block diagram of components of a Web browser-based business process management engine system, in accordance with an embodiment of the disclosure is presented. Browser 300 is an example of a Web browser including a Web browser-based business process management engine system.

Browser 300 is a Web browser comprising a number of components including support of an underlying data processing system such as data processing system 200 of FIG. 2 implementation of client 110 communicating with other systems using network 102 of data processing system 100 of FIG. 1. Browser 300 comprises components including user interface 302, communications 304, storage 306 and business process management engine 308.

User interface 302 comprises features enabling presentation of data to a user and prompting for responses from the user when required typically using display 214 of data processing system 200. Communications 304 provides a capability to send and receive information between browser 300 and a server component such as server 104 of data processing system 100 of FIG. 1. Storage 306 provides a capability for saving presentation information and received data from a server for display and use by a user.

Business process management engine 308 is a lightweight implementation of a business process management engine. Business process management engine 308 provides a capability of a fully functional business process management processing entity. The implementation is such that the throughput and performance capability of business process management engine 308 is diminished by design.

Business process management engine 308 therefore provides a capability of a Web browser-based BPM engine and a browser-to-browser workflow system, enabling Web browsers to serve as BPM engines and choreograph service invocations. Using an embodiment of business process management engine 308, the full BPM lifecycle is supported in the browser, including phases of Model, Assemble, Deploy, and Manage.

Business process management engine 308 provides a capability to enable BPM processes to run within a single Web browser or across multiple Web browsers. In addition, business process management engine 308 can invoke traditional BPM engines implemented on servers and traditional services, for example, Web services as part of the process flow.

Figure 5:
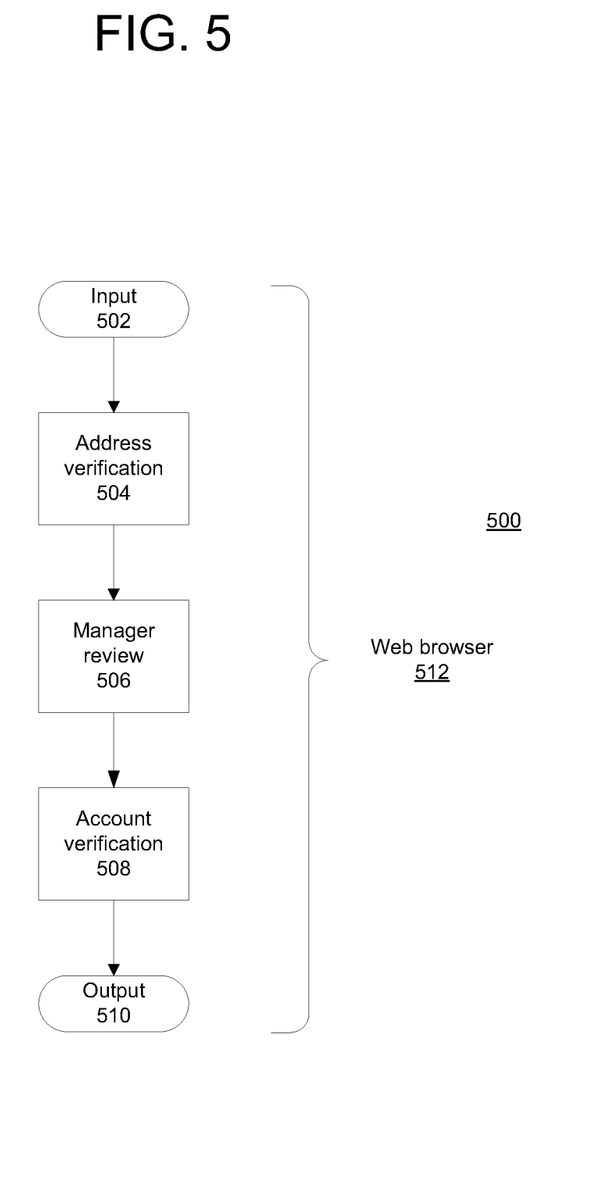
FIG. 5 is a sequence diagram of an enhanced approval process in a context of a Web browser, in accordance with an embodiment of the disclosure.

With reference to FIG. 5, a sequence diagram of an enhanced approval process, in accordance with an embodiment of the disclosure is presented. Process 500 is an example of an enhanced approval process implementation within a context of Web browser 512.

Process 500 comprises address verification 504, manager review 506, and account verification 508, with input 502 and output 510, which are similar in nature to corresponding elements of process 400 of FIG. 4. Process 500, however, differs from the previously described process 400 of FIG. 4 in that the approval process of process 500 runs in (is choreographed with) Web browser 512 as opposed to the business process management server based BPM/workflow engine of process 400. In process 500, address verification 504 and account verification 508 services are Web browser based REST services, as opposed to business process management server 412 server based Java EE or .NET implementations of process 400 of FIG. 4.

While running an address verification service in a Web browser may be known, the example illustrates removal of a dependency on servers to implement a business process management solution, including workflow, and to show process implementation and individual services invoked by the example process all run in a Web browser. Manager review 506, a human task, remains as part of process 500. While using the example, a capability is further provided to enable any of the services, for example, account verification 508, to still run on a .NET or Java EE implementation. The capability therefore provides compatibility with traditional service implementations.

In the example of process 500 all services run in the browser. Parts of a business process lifecycle are supported in a browser, specifically the model portion, and elements of assemble and manage portions, for example, currently available tools to model business processes in a browser, or browser-based monitoring dashboards. However, typical BPM frameworks, systems or engines require a server-based implementation for the deploy phase (for executing the process flow). An implementation of an embodiment of process 500 provides a capability for full BPM lifecycle support in the browser. Using an implementation of an embodiment of process 500 enables the workflow engine to run in a Web browser.

Embodiments of process 500 provide a capability for a lightweight, lower barrier of entry to business process management. Embodiments of process 500 are decentralized, completely removing a dependency on central servers. An end user is provided a capability to execute workflows from a browser of the user, providing the user with a certain level of independence from an information technology department. An implementation of an embodiment of process 500 is scalable and highly available because through addition of multiple Web browsers with redundant processes to a system.

Further, implementations of an embodiment of process 500 are compatible with traditional BPM and service oriented architecture (SOA) approaches which complements existing server-based workflow systems, where parts of the workflow can run on existing BPM and SOA implementations. Implementations of an embodiment of process 500 do not replace existing server-based workflow systems.

However, implementation can be considered a complement to existing server-based workflow systems with a motive of providing an additional decentralized workflow capability granting end users a capability to create, implement and manage associated workflows in respective browsers typically adding greater flexibility to manage day to day operations.

Figure 6:
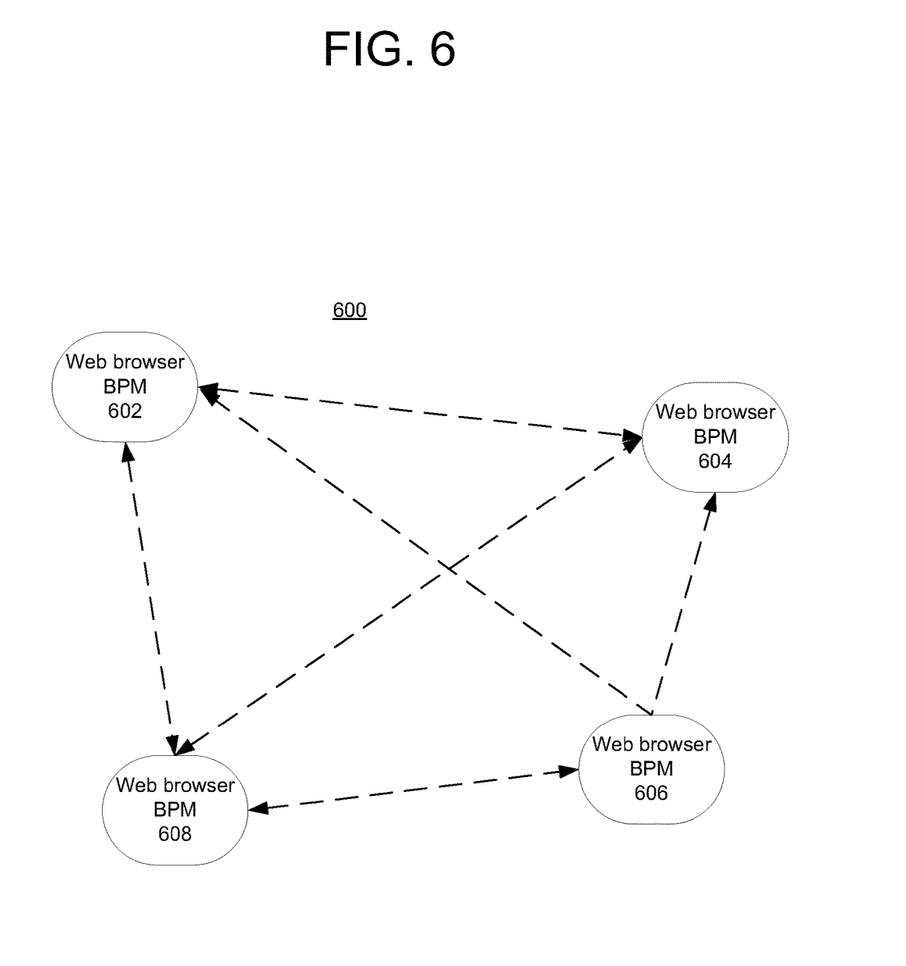
FIG. 6 is a block diagram of a set of Web browser-based business process management engine systems, in accordance with an embodiment of the disclosure.

With reference to FIG. 6, a block diagram of a Web browser-based business process management engine system, in accordance with an embodiment of the disclosure is presented. System 600 is an example of an implementation of a set of Web browser-based business process management engine systems. Each system in the set of Web browser-based business process management engine systems is interconnected with the other systems.

A combination of a web browser acting as a web server, for example, Opera Unite and a web server-based implementation of a BPM engine, for example, ProcessMaker may be implemented in a set of Web browser-based business process management systems. ProcessMaker is a registered trademark of Colosa Inc). In the example of ProcessMaker, a BPM engine is implemented on lightweight Web technology of Windows®, Apache, MySQL, and PHP (WAMP) or LAMP (Linux®, Apache™ MySQL™, and PHP) (Windows is a registered trademark of Microsoft Corporation in the United States and/or other countries. Linux is the registered trademark of Linus Torvalds in the U.S. and other countries. Apache is a trademark of The Apache Software Foundation. MySQL is a trademark of Oracle and/or its affiliates. PHP is available from The PHP Group). The combination uses a web server-based implementation of a BPM engine and the web browser used as a web server to implement a web browser-based BPM engine.

An illustrative embodiment of system 600 may be implemented using existing technologies including Windows®, Apache, MySQL, and PHP (WAMP) or LAMP (Linux®, Apache™, MySQL™, and PHP) for implementing the web server and BPM engine capabilities in a web browser and representational state transfer (REST) for communication between web browser-based BPM engines.

Although nodes 602, 604, 606 and 608 in the web browser-based BPM engine system of system 600 are all web browsers, traditional web servers or web application servers may also be nodes of the system, and participate in the workflow. Embodiments such as the example of system 600 are compatible with existing traditional BPM and web service implementations, because of the use of REST protocol.

A lightweight, WAMP or LAMP-based BPM engine was developed and embedded into a known web browser such as in the examples of node 602, Firefox®, node 604, Google Chrome™, node 606, Opera, and node 608, Internet Explorer® to create a web browser-based BPM engine, with a capability to implement REST-based workflows from within the Web browser (Firefox is a registered trademark of the Mozilla Foundation. Google Chrome is a trademark of Google Inc. Internet Explorer is a registered trademark of Microsoft Corporation in the United States and/or other countries).

In the example of system 600, steps in the workflow are local browser-based web services using REST protocol and web services/workflows using REST protocol implemented on other web browser-based BPM engines. The Web browsers follow the REST architecture style to communicate over hypertext transport protocol (http) or hypertext transport protocol secure (https). For example, using the example of process 500 of FIG. 5, address verification may occur on one node, while account verification occurs on another node and manager review is performed on a third node wherein each operation is performed within a respective Web browser.

Figure 7:
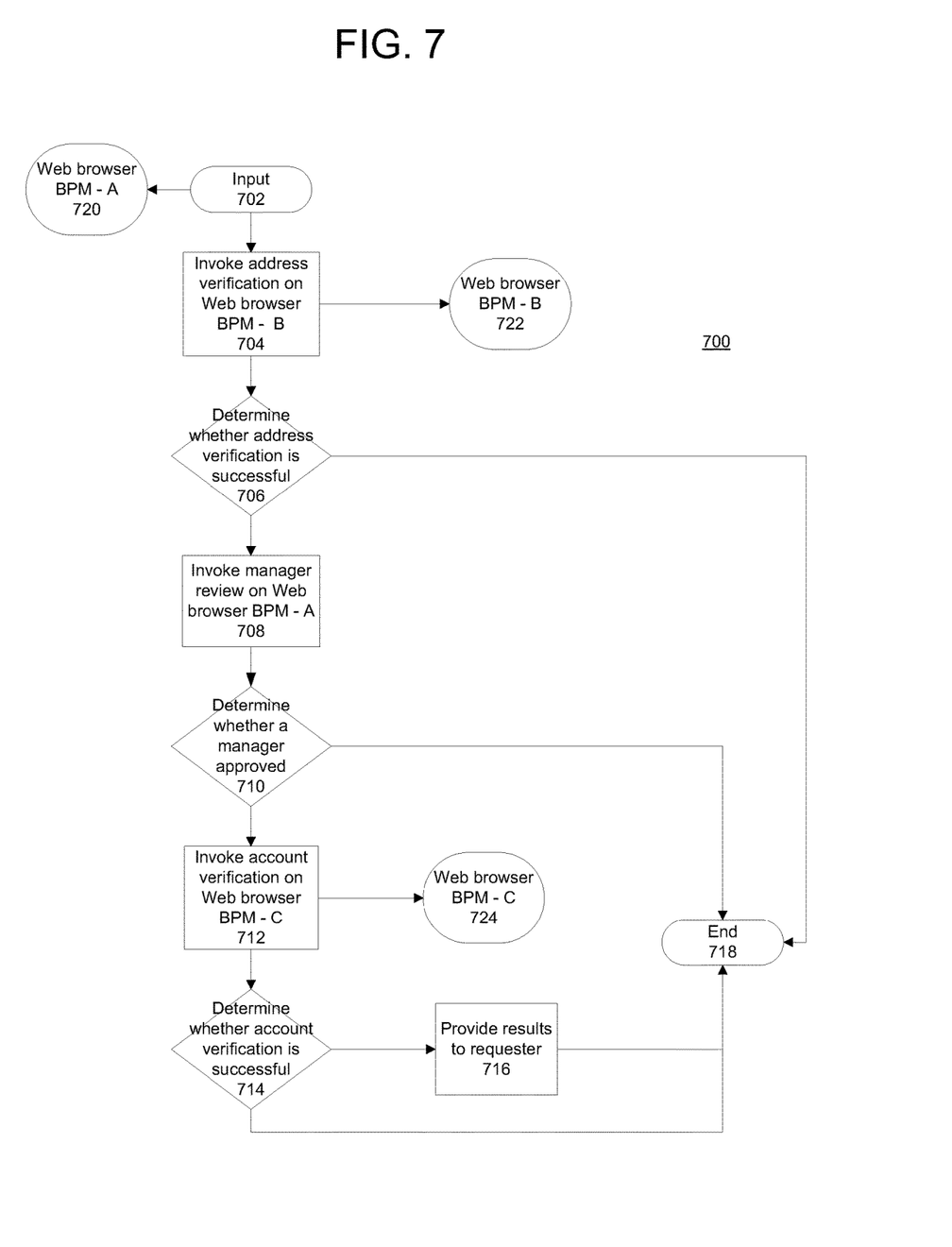
FIG. 7 is a flowchart of an enhanced approval process of FIG. 5 using the Web browser-based business process management engine system of FIG. 6, in accordance with an embodiment of the disclosure.

With reference to FIG. 7, a flowchart of an enhanced approval process of FIG. 5 using the Web browser-based business process management engine system of FIG. 6, in accordance with an embodiment of the disclosure is presented. Process 700 is an example of an implementation of a set of Web browser-based business process management engine systems using the example of process 500 of FIG. 5. The set of Web browser-based business process management engine systems comprises one or more Web browser-based business process management engine systems.

In the example process 700, an approval process runs on Web browser BPM-A 720 but spans Web browser BPM-B 722 and Web browser BPM-C 724, such that operations of process are implemented using Web browser BPM-B 722 and Web browser BPM-C 724. Process 700 begins as Web browser BPM-A 720 initiates the approval process by providing input (step 702). Process 700 invokes address verification REST services on Web browser BPM-B 722 from Web browser BPM-A 720 (step 704).

Process 700 determines whether address verification is successful (step 706). Responsive to a determination that address verification was successful, process 700 invokes the human task for manager review using Web browser BPM-A 720 (step 708).

Responsive to a determination that address verification was not successful, process 700 through Web browser BPM-A 720 terminates the approval process (step 708). A manager uses a personal Web browser, in this example Web browser BPM-A 720, to enter results of the management review.

Responsive to a determination that a manager approved during the manager review process 700 through Web browser BPM-A 720 invokes account verification REST services on Web browser BPM-C 724 (step 712). Responsive to a determination that a manager has not approved during the manager review, process 700 through Web browser BPM-A 720 terminates the approval process (step 718) as before.

Responsive to a determination that account verification was successful, process 700 through Web browser BPM-A 720 provides results to a requester on Web browser BPM-A 720 (step 716) and terminates thereafter (step 718) as before. Responsive to a determination that account verification was not successful, process 700 through Web browser BPM-A 720 terminates the approval process (step 718) as before.

Figure 8:
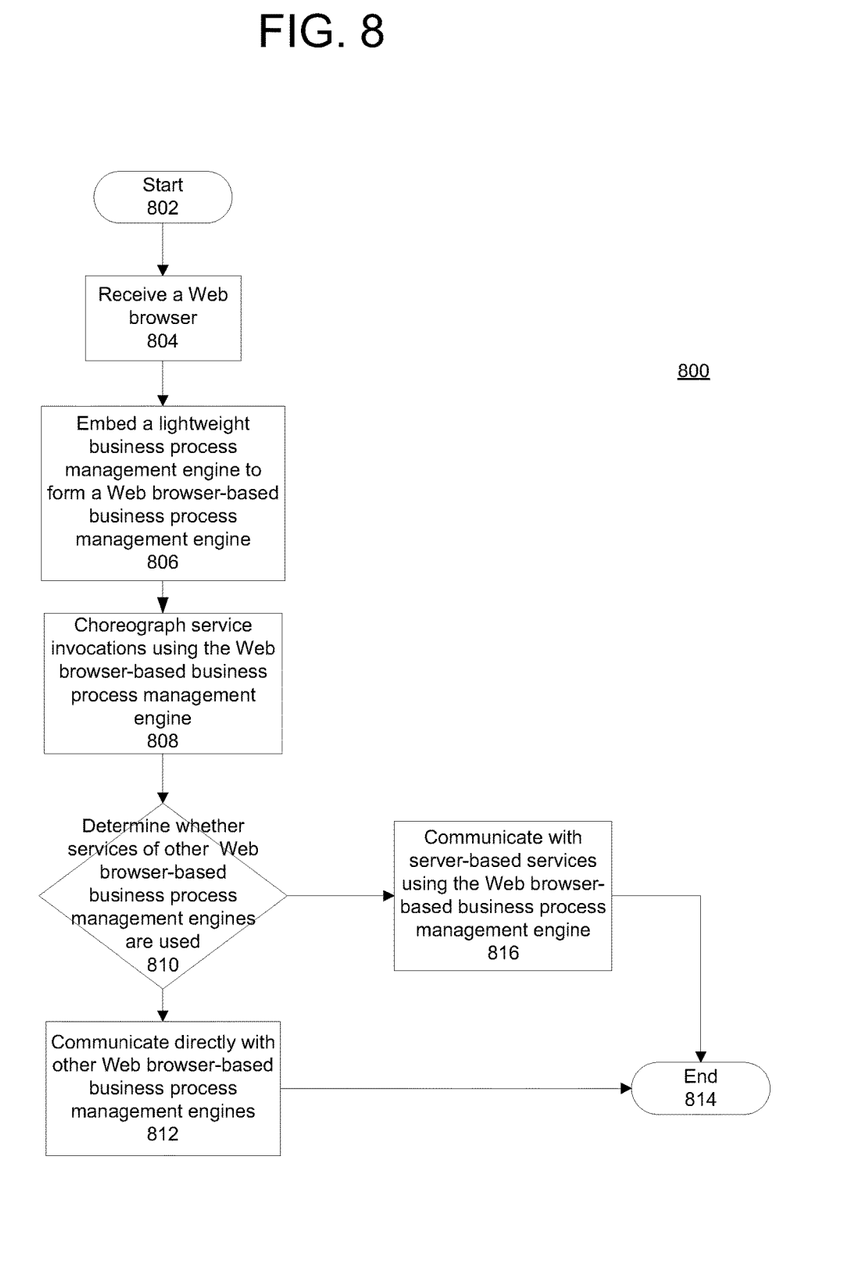
FIG. 8 is a flowchart of a process using a Web browser-based business process management engine system of FIG. 5, in accordance with an embodiment of the disclosure.

With reference to FIG. 8, a flowchart of a process using a Web browser-based business process management engine system of FIG. 5, in accordance with one embodiment of the disclosure is presented. Process 800 is an example of implementing a Web browser-based business process management engine system used in the example of process 500 of FIG. 5.

Process 800 starts (step 802) and receives a Web browser (step 804). The Web browser is supported by a data processing system such as data processing system 200 of FIG. 2. Process 800 embeds a lightweight business process management engine to form a Web browser-based business process management engine (step 806).

Process 800 choreographs service invocations using the Web browser-based business process management engine (step 808). The services being executed are steps in a workflow that are typically local browser-based web services using REST protocol and web services/workflows using REST protocol implemented on other web browser-based business process management engine systems. The implementation of a lightweight business process management engine to form a Web browser-based business process management engine provides a capability for management of a browser-to-browser workflow system, enabling Web browsers to serve as business process management engines and choreograph service invocations. Using an embodiment of a Web browser-based business process management engine, the full business process management lifecycle is supported in the browser, including phases of Model, Assemble, Deploy, and Manage.

The embedded Web browser-based business process management engine provides a capability to enable business process management processes to run within a single Web browser or across multiple Web browsers. In addition, the embedded Web browser-based business process management engine can invoke traditional business process management engines implemented on servers and traditional services, for example, Web services as part of the process flow.

Process 800 determines whether services of other Web browser-based business process management engines are used (step 810). Responsive to a determination that those services of other Web browser-based business process management engines are used, process 800 communicates directly with other Web browser-based business process management engines (step 812) and terminates thereafter (step 814).

Responsive to a determination that service of other Web browser-based business process management engines are not used, process 800 communicates with server-based services using the Web browser-based business process management engine (step 816) and terminates thereafter (step 814). Communication with server-based services in addition to communication directly with other Web browser-based business process management engines provides a capability for compatibility with previous existing implementations of business process management systems.

Thus is presented in an embodiment, a computer-implemented process for a Web browser-based business process management engine. The computer-implemented process receives a Web browser, embeds a lightweight business process management engine in the received Web browser to form a Web browser-based business process management engine and choreograph service invocations using the Web browser-based business process management engine.

The services being executed are steps in a workflow that are typically local browser-based web services using REST protocol and web services/workflows using REST protocol implemented on other web browser-based business process management engine systems. The implementation of a lightweight business process management engine to form a Web browser-based business process management engine provides a capability for management of a browser-to-browser workflow system, enabling Web browsers to serve as business process management engines and choreograph service invocations. Using an embodiment of a Web browser-based business process management engine, the full business process management lifecycle is supported in the browser, including phases of Model, Assemble, Deploy, and Manage.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented process for a Web browser-based business process management engine, the computer implemented process comprising:
   embedding a business process management engine in a Web browser to form a Web browser-based business process management engine,
   wherein the embedding includes supporting a full business process management lifecycle within the Web browser-based business process management engine, including phases of Model, Assemble, Deploy, and Manage; and
   executing services using the Web browser-based business process management engine,
   wherein the executing includes executing services as operations in a workflow that are local browser-based web services using a Representational State Transfer (REST) protocol, and
   wherein the executing further includes:
      determining whether services of another Web browser-based business process management engine are used;
      communicating directly with the another Web browser-based business process management engine if the determining indicates the services of the another Web browser-based business process management engines are used; and communicating with server-based services using the Web browser-based business process management engine if the determining indicates the services of the other Web browser-based business process management engines are not used.

2. The computer-implemented process of claim 1, wherein the executing further comprises:
enabling business process management processes to run within the Web browser and across multiple Web browsers; and
invoking, by the Web browser-based business process management engine, business process management engines implemented on servers and traditional services as part of a process flow.

3. The computer-implemented process of claim 1, wherein the executing further comprises:
communicating directly with other Web browser-based business process management engines.

4. The computer-implemented process of claim 1, wherein the executing further comprises:
communicating directly with other Web browser-based business process management engines; and
communicating with server-based services, wherein the communicating provides a capability for compatibility with previous existing implementations of business process management systems.

5. The computer-implemented process of claim 1, wherein the executing further comprises:
executing services as web services workflows using a REST protocol implemented on other web browser-based business process management engine systems.

6. The computer-implemented process of claim 1, wherein the Web browser-based business process management engine comprises a set of Web browser-based business process management engine systems comprising one or more Web browser-based business process management engine systems.

7. A computer program product provided on a non transitory computer readable storage medium for providing a Web browser-based business process management engine, the computer program product comprising program code for:
embedding a business process management engine in a Web browser to form a Web browser-based business process management engine,
wherein the embedding includes supporting a full business process management lifecycle within the Web browser-based business process management engine, including phases of Model, Assemble, Deploy, and Manage; and
executing services using the Web browser-based business process management engine,
wherein the executing includes executing services as operations in a workflow that are local browser-based web services using a Representational State Transfer (REST) protocol, and
wherein the executing further includes:
determining whether services of another Web browser-based business process management engine are used;
communicating directly with the another Web browser-based business process management engine if the determining indicates the services of the another Web browser-based business process management engines are used; and
communicating with server-based services using the Web browser-based business process management engine if the determining indicates the services of the other Web browser-based business process management engines are not used.

8. The computer program product of claim 7, wherein the executing further comprises:
business process management processes to run within the Web browser or across multiple Web browsers; and
invoking, by the Web browser-based business process management engine, business process management engines implemented on servers and traditional services as part of a process flow.

9. The computer program product of claim 7, wherein the executing further comprises:
communicating directly with other Web browser-based business process management engines.

10. The computer program product of claim 7, the executing further comprises:
communicating directly with other Web browser-based business process management engines; and
communicating with server-based services, wherein the communicating provides a capability for compatibility with previous existing implementations of business process management systems.

11. The computer program product of claim 7, wherein the executing further comprises:
executing services web services workflows using a REST protocol implemented on other web browser-based business process management engine systems.

12. The computer program product of claim 7, wherein the Web browser-based business process management engine is a set of Web browser-based business process management engine systems comprising one or more Web browser-based business process management engine systems.

13. An apparatus for a Web browser-based business process management engine, the apparatus comprising:
a computer system configured for:
embedding a business process management engine in a Web browser to form a Web browser-based business process management engine,
wherein the embedding includes supporting a full business process management lifecycle within the Web browser-based business process management engine, including phases of Model, Assemble, Deploy, and Manage; and
choreographing service invocations using the Web browser-based business process management engine,
wherein the choreographing includes executing services as operations in a workflow that are local browser-based web services using a Representational State Transfer (REST) protocol, and
wherein the choreographing further includes:
determining whether services of another Web browser-based business process management engine are used;
communicating directly with the another Web browser-based business process management engine if the determining indicates the services of the another Web browser-based business process management engines are used; and
communicating with server-based services using the Web browser-based business process management engine if the determining indicates the services of the other Web browser-based business process management engines are not used.

14. The apparatus of claim 13, wherein the choreographing further comprises:
enabling business process management processes to run within the Web browser or across multiple Web browsers; and
invoking, by the Web browser-based business process management engine, business process management engines implemented on servers and traditional services as part of a process flow.

15. The apparatus of claim 13, wherein the choreographing further comprises:
communicating directly with other Web browser-based business process management engines.

16. The apparatus of claim 13, wherein the choreographing further comprises:
communicating directly with other Web browser-based business process management engines; and
communicating with server-based services, wherein the communicating provides a capability for compatibility with previous existing implementations of business process management systems.

17. The apparatus of claim 13, wherein the choreographing further comprises:
executing services as web services workflows using a REST protocol implemented on other web browser-based business process management engine systems, wherein the Web browser-based business process management engine is a set of Web browser-based business process management engine systems comprising one or more Web browser-based business process management engine systems.

* * * * *